Figure 1:
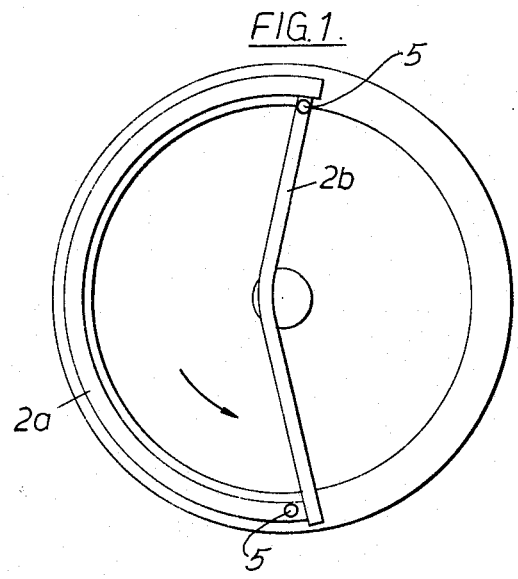

United States Patent [19]
O'Neill

[11] 3,917,291
[45] Nov. 4, 1975

[54] HEAT EXCHANGER SEALS

[75] Inventor: John Sidney O'Neill, Alcester, England

[73] Assignee: British Leyland Truck & Bus Division Ltd., Leyland, England

[22] Filed: Apr. 10, 1973

[21] Appl. No.: 349,868

[30] Foreign Application Priority Data
Apr. 12, 1972 United Kingdom............... 16790/72

[52] U.S. Cl..................... 277/96 A; 165/9; 277/136
[51] Int. Cl.².......................................... F16J 15/54
[58] Field of Search.......... 277/96 R, 96 A, 81, 231, 277/136; 165/9

[56] References Cited
UNITED STATES PATENTS

| | | | |
|---|---|---|---|
| 2,678,193 | 5/1954 | Stevens et al..................... | 277/96 R |
| 2,910,329 | 10/1959 | Runton................................ | 161/42 |
| 3,093,383 | 6/1963 | Lew................................... | 277/96 R |
| 3,300,225 | 1/1967 | Shepler.............................. | 277/165 |
| 3,512,790 | 5/1970 | Mancel.............................. | 277/96 R |
| 3,584,889 | 6/1971 | Sheets................................ | 285/231 |
| 3,601,414 | 8/1971 | Rao.................................... | 277/96 R |
| 3,659,861 | 5/1972 | Rao et al........................... | 277/96 R |
| 3,692,098 | 9/1972 | Barnard............................. | 165/9 |
| 3,708,387 | 1/1973 | Turner et al...................... | 161/168 |
| 3,778,293 | 12/1973 | Silverstone........................ | 165/9 |
| 3,790,432 | 2/1974 | Fletcher et al................... | 161/42 |

Primary Examiner—Richard E. Aegerter
Assistant Examiner—John W. Sheppard
Attorney, Agent, or Firm—Thomas J. Greer, Jr.

[57] ABSTRACT

A seal for a gas turbine rotary heat exchanger as characterised in that it is made from a polymer which may contain stiffening materials and/or dry lubricants.

1 Claim, 2 Drawing Figures

HEAT EXCHANGER SEALS

The present invention relates to heat exchanger seals and more particularly to seals for use in conjunction with rotary heat exchangers fitted in gas turbine engines.

The kind of rotary heat exchanger which is relevant to the present invention is disclosed in UK Pat. No. 1,251,906. In the arrangement disclosed in that patent the heat exchanger has a so-called "hot" side and a "cold" side, the hot side being provided with a nickel oxide seal and the cold side being provided with a carbon seal.

The present invention is concerned with the construction of a seal suitable for use on the cold side of the rotary heat exchanger.

According to the present invention a seal of the kind described is made from a polymer which may contain stiffening materials and/or dry lubricants either separately or in combination. These additions may be dispersed powders, filament or woven cloth. The stiffening materials may be glass, carbon or bronze, whilst the dry lubricants include graphite, molybdenum disulphide, polytetrafluoroethylene and polyfluorethylenepropylene.

Examples of seal compositions include a polyimide resin with an addition of 20% graphite by volume, and a polyimide resin containing 60% woven glass laminate by volume.

According to one aspect of the present invention the seal of the kind described is formed in two parts, namely a circumferential part and a diametral part, each part having one of its ends anchored to a seal support and the other end free to move under the effects of thermal expansion.

Figure 2:
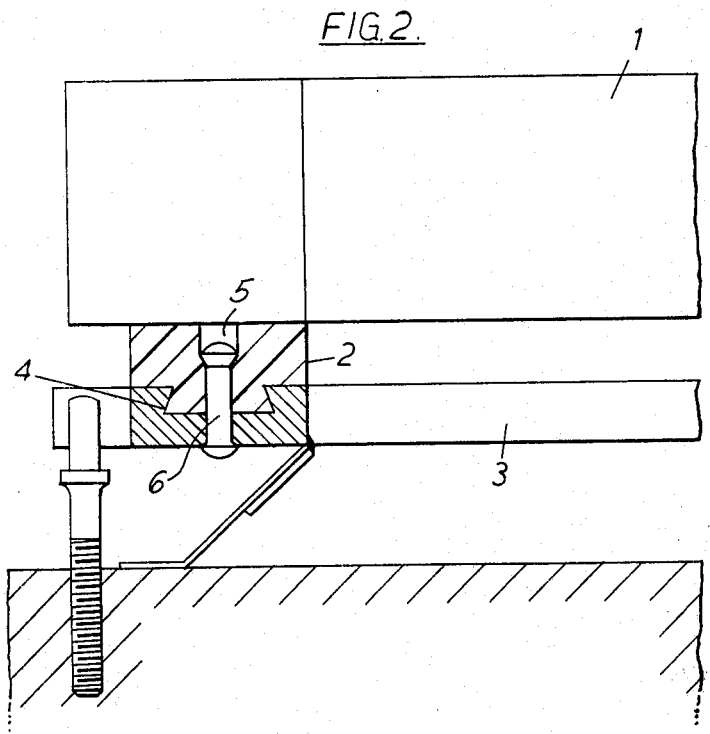

How the invention may be carried out will now be described by way of example only and with reference to the accompanying drawings in which:

FIG. 1 is a schematic elevational view of a rotary heat exchanger having a seal incorporating the present invention; and FIG. 2 is a fragmentary sectional view on a larger scale of the seal shown in FIG. 1.

The ceramic microcellular heat exchanger disc 1 is provided with a seal 2 on its cold side. The seal 2 is made up of two parts, namely the circumferential part 2a and the diametral part 2b.

Each of the parts 2a and 2b has one of its ends mechanically located on the seal mounting 3 and its other end free to move under the effects of thermal expansion.

Each of the two parts 2a and 2b of the seal are formed from a suitable polymer such as polyamides and polyoxybenzoyls, for example that manufactured by Carborundum Limited under the trade mark "Ekonol", which is a paraoxybenzoyl polymer, which have been modified to contain stiffening aids and dry lubricants such as carbon, glass, polytetrafluoroethylene and polyfluorethylenepropylene, molybdenum disulphide.

The mixture referred to above is formed into a cross-sectional shape suitable for retention in a groove 4 formed in the seal support 3, that shown in FIG. 2 being of dovetail cross-section.

Each of the parts 2a and 2b of the seal could themselves be made up of several blocks, ie. lengths, which are separately assembled adjacent one another, ie. end to end, in the groove 4.

It has been found that a moulded polymer seal of the kind described reduces the friction losses and gas leakages between the seal and the heat exchanger matrix disc 1 and also reduces the cost of manufacture and assembly of the seal.

I claim:

1. A seal assembly for the cold side of a rotary heat exchanger which includes,
  a. an elongate flexible seal member,
  b. a support member,
  c. said seal member having two portions, an arcuate portion and a diametral portion,
  d. said support member having two portions, an arcuate portion and a diametral portion,
  e. each of said support members having a groove extending along its length,
  f. said seal members and said grooves in said support members being of complimentary undercut shape so that the seal members are located on the support members,
  g. first means to mechanically secure one end of said diametral seal member to said diametral support member against relative longitudinal movement,
  h. second means to mechanically secure one end of said arcuate seal member to said arcuate support member against relative longitudinal movement,
  i. a portion of said diametral seal member remote from said secured end abutting said secured end of said arcuate seal member,
  j. a portion of said arcuate seal member remote from said secured end abutting said secured end of said diametral seal member.

* * * * *